United States Patent
Kang et al.

(10) Patent No.: US 8,725,733 B2
(45) Date of Patent: May 13, 2014

(54) SYSTEM AND METHOD FOR PROVIDING SEARCH RESULTS BASED ON REGISTRATION OF EXTENDED KEYWORDS

(75) Inventors: Hye Jin Kang, Seongnam-si (KR); Ki Oh Kwon, Seongnam-si (KR)

(73) Assignee: NHN Business Platform Corporation, Seongnam-si (KR)

( * ) Notice: Subject to any disclaimer, the term of this patent is extended or adjusted under 35 U.S.C. 154(b) by 23 days.

(21) Appl. No.: 12/935,679

(22) PCT Filed: Feb. 26, 2009

(86) PCT No.: PCT/KR2009/000907
§ 371 (c)(1), (2), (4) Date: Apr. 25, 2011

(87) PCT Pub. No.: WO2009/123399
PCT Pub. Date: Oct. 8, 2009

(65) Prior Publication Data
US 2011/0258191 A1    Oct. 20, 2011

(30) Foreign Application Priority Data
Mar. 31, 2008  (KR) .................. 10-2008-0030026

(51) Int. Cl.
G06F 17/30  (2006.01)
(52) U.S. Cl.
USPC .......................................... 707/737
(58) Field of Classification Search
USPC .......................................... 707/737
See application file for complete search history.

(56) References Cited

U.S. PATENT DOCUMENTS

| | | | |
|---|---|---|---|
| 6,421,675 B1 * | 7/2002 | Ryan et al. .................... | 1/1 |
| 7,359,893 B2 * | 4/2008 | Sadri et al. .................... | 1/1 |
| 7,627,559 B2 * | 12/2009 | Srivastava et al. .............. | 1/1 |
| 7,752,200 B2 * | 7/2010 | Scholl et al. ................... | 707/730 |
| 8,463,783 B1 * | 6/2013 | Yagnik .......................... | 707/737 |
| 2005/0021397 A1 | 1/2005 | Cui et al. | |
| 2006/0041536 A1 * | 2/2006 | Scholl et al. ................... | 707/3 |
| 2006/0293950 A1 | 12/2006 | Meek et al. | |
| 2007/0226197 A1 * | 9/2007 | Kawakami et al. .............. | 707/3 |
| 2007/0250901 A1 | 10/2007 | McIntire et al. | |

(Continued)

FOREIGN PATENT DOCUMENTS

| | | |
|---|---|---|
| JP | 2003-242159 | 8/2003 |
| JP | 2007-517339 | 6/2007 |

(Continued)

OTHER PUBLICATIONS

International Search Report issued for co-pending International Application No. PCT/KR2009/000907 on Aug. 26, 2009.

(Continued)

Primary Examiner — Sheree Brown
(74) Attorney, Agent, or Firm — Greer Burns & Crain Ltd.

(57) ABSTRACT

Provided is a system and method providing a search result by registering an extended keyword. A search result providing system may include a registration keyword determining unit to determine whether a registration keyword is required to be additionally registered based on at least of information associated with a registration of an input keyword, and a registration keyword registration unit to additionally register the registration keyword associated with the input keyword.

10 Claims, 5 Drawing Sheets

(56) References Cited

U.S. PATENT DOCUMENTS

| | | | | |
|---|---|---|---|---|
| 2008/0021878 | A1* | 1/2008 | Jeong | 707/3 |
| 2008/0177732 | A1* | 7/2008 | Sadri et al. | 707/5 |
| 2008/0243617 | A1* | 10/2008 | Song et al. | 705/14 |
| 2008/0243797 | A1* | 10/2008 | Song et al. | 707/3 |
| 2010/0106594 | A1* | 4/2010 | Song et al. | 705/14.42 |

FOREIGN PATENT DOCUMENTS

| | | |
|---|---|---|
| JP | 2008-507027 | 3/2008 |
| KR | 1020040063641 | 7/2004 |
| KR | 10-0481141 | 3/2005 |
| KR | 1020050082998 | 8/2005 |
| KR | 10-2006-0012066 | 2/2006 |
| KR | 1020060025726 | 3/2006 |
| KR | 10-2006-0052853 | 5/2009 |
| WO | 2005/065401 | 7/2005 |
| WO | 2006/009366 | 1/2006 |
| WO | 2006/073957 | 7/2006 |
| WO | 2007-001770 | 1/2007 |

OTHER PUBLICATIONS

Non-Final Office Action issued on Jan. 31, 2012 in U.S. Appl. No. 12/530,260.

Final Office Action dated Aug. 21, 2012 in U.S. Appl. No. 12/530,260.

* cited by examiner

SYSTEM AND METHOD FOR PROVIDING SEARCH RESULTS BASED ON REGISTRATION OF EXTENDED KEYWORDS

BACKGROUND OF THE INVENTION

1. Field of the Invention

Exemplary embodiments of the present invention relate to a system and method for providing a search result by registering an extended keyword, and more particularly, to a system and method for automatically registering an additional keyword by extending a keyword registered by an advertiser.

2. Description of the Background

A keyword advertisement is an advertisement by exposing an advertisement on a search result page in which an advertiser purchases a predetermined keyword. A user retrieves an advertisement by inputting a keyword corresponding to the advertisement. The keyword advertisement may show advertisement contents to a person who is interested in a product or a service corresponding to the inputted keyword, and an effect of the keyword advertisement may be enhanced as a rate of clicking on the advertisement is high.

In the keyword advertisement field, the advertiser may maximize the advertisement effect by frequently exposing the advertisement to the user, and a media providing the advertisement to the user may increase revenue to the extent that the advertisement is applied. Therefore, there is need for a system and method for providing a search result to enhance advertisement effect and sales.

SUMMARY OF THE INVENTION

Exemplary embodiments of the present invention provide a system and method for providing a search result to extend an amount to which an advertisement is applied to enhance an advertisement effect and increase revenue by additionally registering a registered keyword corresponding to an extended keyword based on title and description (T&D) information and a keyword inputted from an advertiser at the time of registering a keyword.

Exemplary embodiments of the present invention also provide a system and method for providing a search result to maximize an advertisement effect and increase revenue by additionally registering the registration keyword based on the input keyword and the T&D information, and to expose the advertisement with respect to other keywords associated with the advertisement.

Exemplary embodiments of the present invention also provide a system and method for providing a search result to extend an amount to which an advertisement is applied to enhance an advertisement effect and increase revenue by performing a clustering with respect to a plurality of keywords to generate and maintain at least one keyword set, and by additionally registering the registered keyword using at least one keyword among keywords of the keyword set including a word corresponding to the at least one of information in the keyword set.

Additional features of the invention will be set forth in the description which follows, and in part will be apparent from the description, or may be learned by practice of the invention.

Exemplary embodiments of the present invention disclose a search result providing system, including a registration keyword determining unit to determine a registration keyword to be additionally registered based on at least one of information inputted associated with a registration of an input keyword, and a registration keyword registration unit to additionally register the registration keyword associated with the input keyword.

According to exemplary embodiments, at least one of information may include the input keyword, and title and description (T&D) information inputted associated with the input keyword, and the registration keyword determining unit may determine the registration keyword based on at least one word associated with at least one of the input keyword, the T&D information, and a website corresponding to a universal resource locator (URL) included in the T&D information.

According to exemplary embodiments, the registration keyword registration unit may determine the registration keyword based on at least one of whether a keyword is purchased, whether the input keyword partially matches a word or phrase included in the at least one portion of information, a correlation between words, a correlation of the T&D information, a site crawling based on a URL included in the T&D information, and an advertisement performance according to the input keyword or the registration keyword.

According to exemplary embodiments, the system may further include a keyword set generator to perform a clustering with respect to a plurality of keywords to generate and maintain at least one keyword set, wherein the registration keyword determining unit may determine the registration keyword using at least one keyword among keywords in the keyword set including a word corresponding to the at least one of information.

According to exemplary embodiments, the system may further include a registration keyword updating unit to update the registration keyword according to at least one of a change in the at least one of information and a period of time.

According to exemplary embodiments, the system may further include a determining function provider to provide a determining function for determining whether the registration keyword is used using a page on which the input keyword is registered.

According to exemplary embodiments, the system may further include a search result exposing unit to expose a search result associated with the input keyword when a keyword received from a user corresponds to at least one of the input keyword, the registration keyword or the both.

Exemplary embodiments of the present invention disclose a search result providing system which includes a keyword set generator to perform a clustering with respect to a plurality of keywords to generate and maintain at least one keyword set, and a registration keyword determining unit to determine a registration keyword to be additionally registered based on at least one of information inputted associated with a registration of an input keyword and the keyword set.

Exemplary embodiments of the present invention disclose a search result providing method including determining a registration keyword to be additionally registered, based on at least one of information inputted associated with a registration of an input keyword, and additionally registering the registration keyword associated with the input keyword.

Exemplary embodiments of the present invention discloses a search result providing method including performing a clustering with respect to a plurality of keywords to generate and maintain at least one keyword set, and determining a registration keyword to be additionally registered based on the keyword set and at least one of information inputted associated with a registration of an input keyword.

It is to be understood that both the foregoing general description and the following detailed description are exemplary and explanatory and are intended to provide further explanation of the invention as claimed Effect of the Invention According to exemplary embodiments of the present invention, an amount to which an advertisement is applied may be extended to enhance an advertisement effect and increase revenue by additionally registering a registration keyword corresponding to an extended keyword based on title and description (T&D) information and an input keyword inputted from an advertiser at the time of registering a keyword.

According to exemplary embodiments of the present invention, an advertisement effect may be maximized and revenue may be increased by additionally registering the registration keyword based on the input keyword and the T&D information to expose the advertisement with respect to other keywords associated with the advertisement.

According to exemplary embodiments of the present invention, an amount to which an advertisement is applied may be extended to enhance an advertisement effect and increase revenue by performing a clustering with respect to a plurality of keywords to generate and maintain at least one keyword set, and by additionally registering the registration keyword at least one keyword among keywords of the keyword set including a word corresponding to at least one of information in the keyword set.

DETAILED DESCRIPTION OF THE ILLUSTRATED EMBODIMENTS

Figure 1:
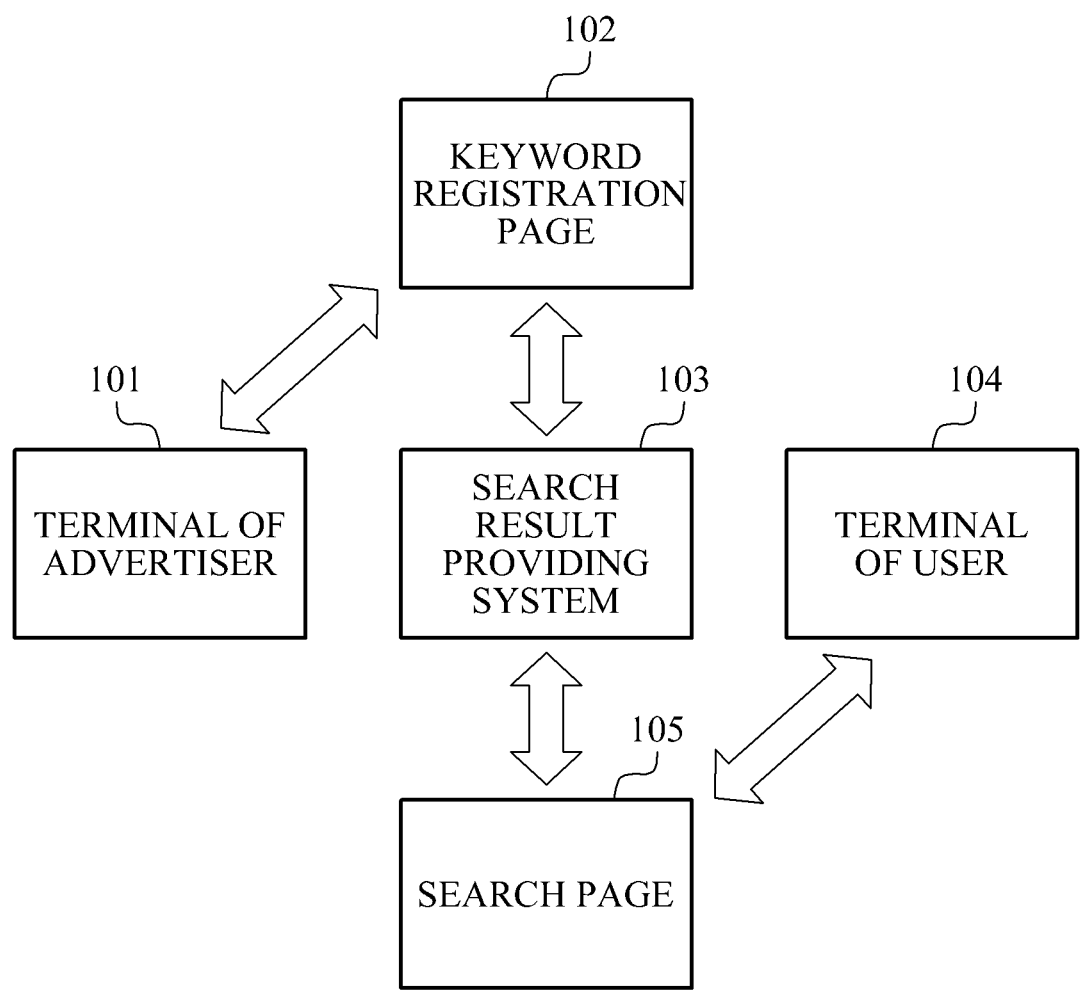
FIG. 1 is a block diagram illustrating of a search result providing system according to exemplary embodiments of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block diagram illustrating of a search result providing system according to exemplary embodiments of the present invention. When an advertiser accesses a keyword registration page 102 via a network to purchase and register a keyword to be used for an advertisement of the advertiser, a search result providing system 103 may automatically register an input keyword corresponding to the registered keyword, and a registration keyword may be extended from the input keyword according to an option of the advertiser. Thus, when a user accesses a search page 105 through a terminal of user 104 to obtain a search result, and inputs a search keyword for a search, the search result providing system 103 may extend an amount to the extent that the advertisement is applied associated with exposing the advertisement using the input keyword, exposing the advertisement through a match between the search keyword and the input keyword, and matching between the search keyword and the registration keyword.

Figure 2:
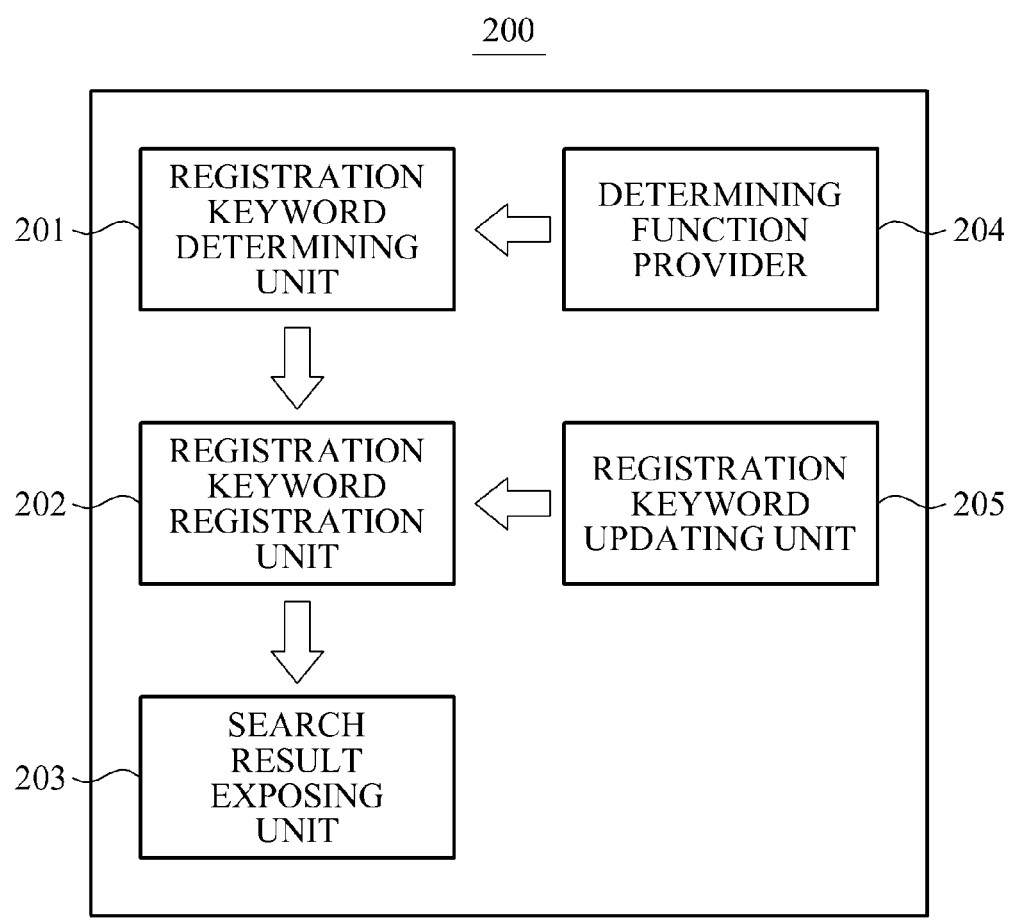
FIG. 2 is a block diagram illustrating a structure of a search result providing system according to exemplary embodiments of the present invention.

FIG. 2 is a block diagram illustrating a structure of a search result providing system 200 according to exemplary embodiments of the present invention. Referring to FIG. 2, the search result providing system 200 may include a registration keyword determining unit 201, a registration keyword registration unit 202, a search result exposing unit 203, a determining function provider 204, and a registration keyword updating unit 205.

The registration keyword determining unit 201 may determine a registration keyword whether a keyword to be additionally registered based on at least one of information inputted associated with a registration of an input keyword. In this example, at least one portion of information may include the input keyword, and title and description (T&D) information associated with the input keyword. The registration keyword determining unit 201 may determine whether the registration keyword based on at least one word is associated with at least one of (1) the input keyword, (2) the T&D information, or (3) a website corresponding to a universal resource locator (URL) of the T&D information. For example, the registration keyword determining unit 201 may determine whether a word corresponding to the input keyword, a word included in the T&D information, or a word included in the corresponding advertisement site as the registration keyword. The determining unit 201 further determining whether a word has a close correlation with the word corresponding to the input keyword. In some examples, not only the word corresponding to the input keyword but also the word having close correlation with the word corresponding to the input keyword and a fact whether the word is purchased as a keyword may be used for determining the registration keyword.

The registration keyword determining unit 201 may determine the registration keyword based on at least one of (1) whether a keyword is purchased, (2) whether the input keyword partially matches a word or phrase included in the at least one portion of information, (3) a correlation between words, (4) a correlation of the T&D information, (5) a site crawling based on a URL included in the T&D information, and (6) an advertisement performance according to the input keyword or the registration keyword. In this example, the correlation between words may be measured based on at least one word of the input keyword, and a word associated with the T&D information and a website based on the URL. The correlation of the T&D information may include a correlation measured between the T&D information and the input keyword. For example, the registration keyword determining unit 201 may determine a registration keyword if a word having a correlation with the input keyword is closer than a predetermined correlation among words of the T&D information. The above examples are provided for ease of description of the overall invention, and the present invention may not be limited to the disclosed embodiments. Those skilled in the art may perform various modifications and changes from the description without departing from the scope of the present invention. Even though a single word may be used to determine the registration keyword, a combination of words may be the registration keyword.

The search result providing system 200 may further include a keyword set generator (not shown) to perform a clustering with respect to a plurality of keywords to generate and maintain at least one keyword set, and the registration keyword determining unit 201 may determine a registration keyword whether to be additionally registered based on at least one portion of information inputted associated with a registration of an input keyword and the keyword set. The keyword set generator may generate the keyword set by performing a clustering with respect to a plurality of keywords based on at least one of (1) whether a keyword is purchased, (2) whether the input keyword partially matches a word or phrase of at least one of information, (3) a correlation between words, (4) a correlation of the T&D information, (5) a site crawling based on a URL included in the T&D information, (6) an advertisement performance according to the input keyword or the registration keyword or any combinations thereof. In some examples, at least one portion of information may include the input keyword and T&D information inputted associated with the input keyword. In this example, the registration keyword determining unit 201 may determine the registration keyword using at least one keyword among keywords in the keyword set including a word corresponding to the at least one portion of information. For example, the registration keyword determining unit 201 may determine the registration keyword using at least one keyword among keywords in the keyword set including the input keyword to be registered.

Determining on the registration keyword will be further described with reference to exemplary embodiments of FIG. 3 and FIG. 4.

The registration keyword registration unit 202 may additionally register the registration keyword associated with the input keyword. When an advertiser inputs the input keyword as a keyword with respect to an advertisement of the advertiser, the search result providing system 200 may optionally determine the registration keyword by the registration keyword determining unit 201, and may additionally register, by the registration keyword registration unit 202, the determined registration keyword associated with the input keyword.

When a keyword received from a user the keyword corresponding to at least one of the input keyword and the registration keyword, the search result exposing unit 203 may expose a search result associated with the input keyword. The advertisement may be exposed when the user inputs the same keyword as the input keyword registered by the advertiser, and when the user inputs the same keyword as the registration keyword. Accordingly, an amount to the extent that the advertisement is applied may be extended, thereby an advertisement effect and revenue may be enhanced.

The determining function provider 204 may provide a determining function to determine whether the registration keyword is used using a page to which the input keyword is registered. Since the advertiser may desire that the advertisement is exposed only with respect to the input keyword inputted by the advertiser, the search result providing system 200 may enable the advertiser to determine whether the registration keyword is used by providing the determining function on the page associated with the determining function provider 204.

The registration keyword updating unit 205 may update the registration keyword according to at least one of a change of information, a predetermined period of time or the both. A URL of a website that the advertiser desires to expose according to the input keyword may be changed, or a correlation between words may be changed over time. For example, when an entertainer appears in an advertisement for a product, a correlation between a name of the entertainer and a name of the product may rapidly increase, and the correlation may decrease over time. Thus, when the registration keyword updating unit 205 updates the registration keyword according to at least one of a change of information, a predetermined period of time, or the both, the search result providing system 200 may enable a keyword having closer correlation to be automatically registered with respect to the advertisement of the advertiser.

For example, the search result providing system 200 may reduce additional costs by determining a maximum cost with respect to a cost incurred based on the registration keyword, or by preventing the advertisement of the advertiser from being exposed with respect to the registration keyword having low priority.

As described above, when the search result providing system 200 according to exemplary embodiments of the present invention is used, an amount to which an advertisement is applied may be extended to maximize an advertisement effect and increase sales by additionally registering the registration keyword corresponding to a keyword extending based on the T&D information and the input keyword inputted from the advertiser during the registration of the keyword. The advertisement effect may be maximized and revenue may be increased by additionally registering the registration keyword based on the input keyword and the T&D information to expose the advertisement with respect to other keywords associated with the advertisement of the advertiser.

The amount to which the advertisement is applied may be extended to maximize an advertisement effect and increase revenue by performing a clustering with respect to a plurality of keywords to generate and maintain at least one keyword set, and by additionally registering at least one keyword as the registration keyword, and the keyword additionally being registered among keywords of the keyword set including a word corresponding to the at least one portion of information.

Figure 3:
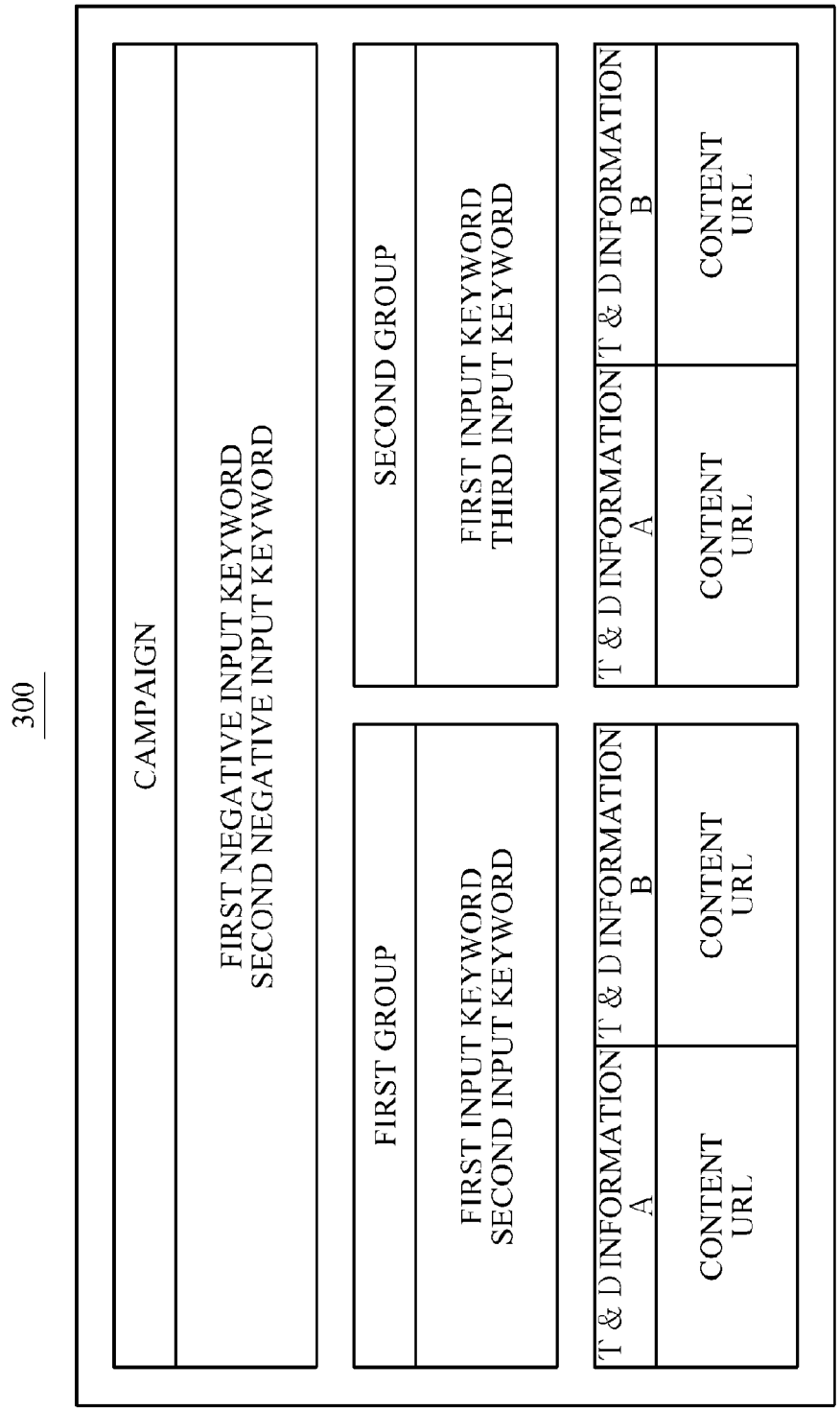
FIG. 3 is a diagram illustrating exemplary information associated with a registration of an input keyword.

FIG. 3 is a diagram illustrating exemplary information associated with a registration of an input keyword. A table 300 describes T&D information and input keywords registered by an advertiser. When the advertiser is to use a registration keyword, a search result providing system 200 described with reference to FIG. 2 may determine the registration keyword to be additionally registered using information such as the table 300. For example, the registration keyword may be determined, for example, based on a keyword partially including the input keyword inputted by the advertiser, a word having a close correlation with a word associated the input keyword and the T&D information, a word obtained by crawling a site according to a URL, a combination of the words. The determination of the registration keyword may be influenced by whether the word or keyword is purchased or by an advertisement performance when the word or keyword is purchased. Alternatively, any condition associated with the advertisement of the advertiser may influence the determination of the registration keyword.

As described above, a correlation between all of words and keywords considered as the registration keyword may be scored, and a predetermined number of words or keywords may be determined as the registration keyword based on a score. The registration keyword may be determined based on a correlation between the input keyword and the T&D information with respect to the words and keywords.

Figure 4:
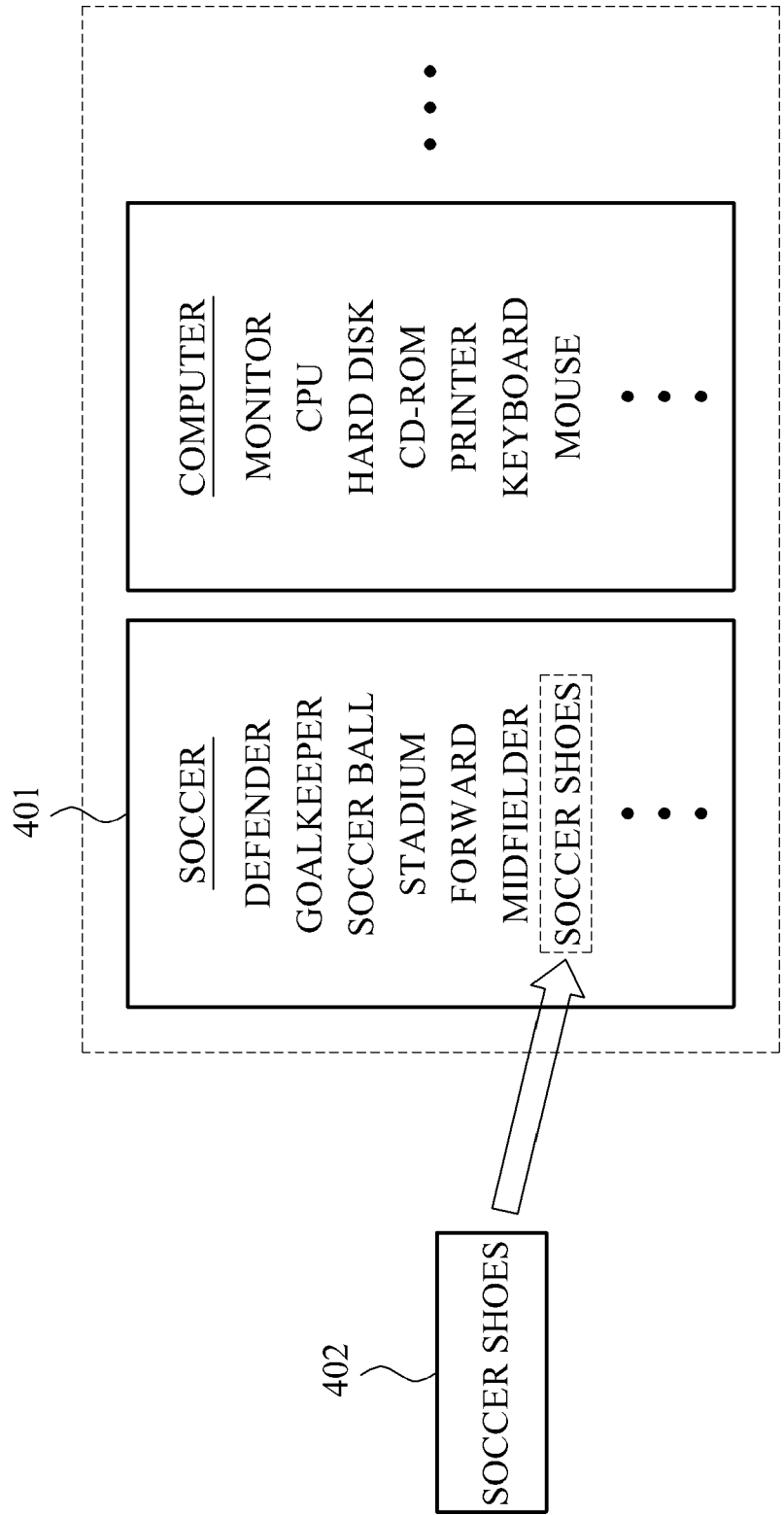
FIG. 4 is a diagram illustrating an exemplary keyword set.

FIG. 4 is a diagram illustrating an exemplary keyword set. As shown in FIG. 4, a plurality of keyword sets such as a keyword set 'soccer' 401 may exist, and the same keyword may be included in different keyword sets. When an input keyword 'soccer shoes' 402 is inputted as a keyword with respect to an advertisement by an advertiser, a search result providing system may determine all remaining keywords or some of keywords in the keyword set 'soccer' 401 including the input keyword 'soccer shoes' 402 as a registration keyword. The keyword sets may continuously be updated to maintain a correlation between keywords in a keyword set.

Figure 5:
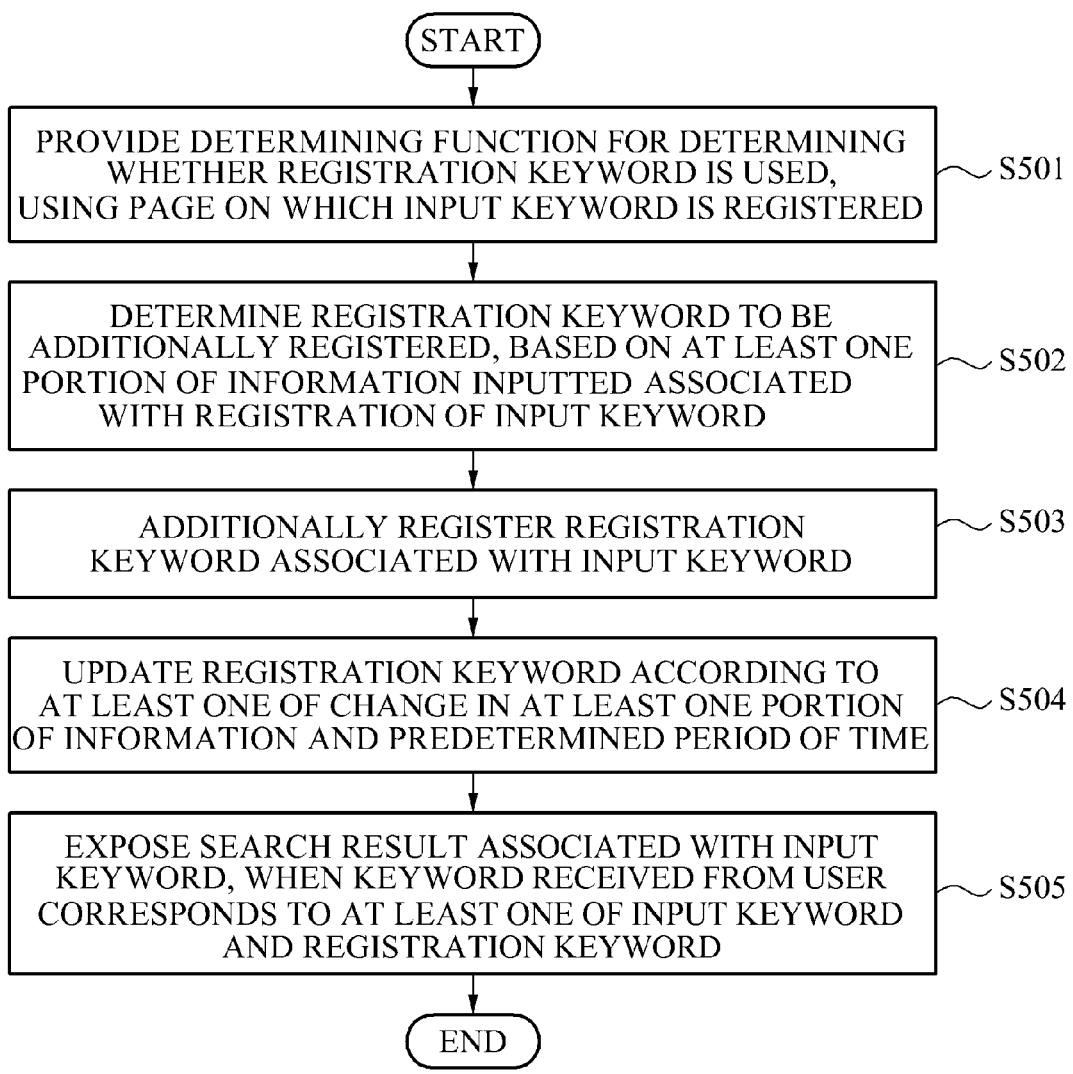
FIG. 5 is a flowchart of a process for illustrating a search result providing method according to exemplary embodiments of the present invention.

FIG. 5 is a flowchart of a process for illustrating a search result providing method according to exemplary embodiments of the present invention. The search result providing method according to exemplary embodiments of the present invention may be performed by the above-mentioned search result providing system according to exemplary embodiments of the present invention. In FIG. 5, the search result providing method is described by a process performed by the search result providing system.

In operation S501, the search result providing system may provide a determining function for determining whether the registration keyword is used by using a page on which the input keyword is registered. Since the advertiser may desire that the advertisement is exposed only with respect to the input keyword inputted by the advertiser, the search result providing system may enable the advertiser to determine whether the registration keyword is used by providing the determining function associated with the page.

In operation S502, the search result providing system may determine whether the registration keyword to be additionally registered based on at least one of information inputted associated with a registration of the input keyword. In this example, at least one portion of information may include the input keyword, and T&D information inputted associated with the input keyword, and the search result providing system may determine the registration keyword based on at least one word associated with at least one of (1) the input keyword, (2) the T&D information, (3) a website corresponding to a URL included in the T&D information, or any combinations thereof. For example, the registration keyword determining unit may determine the registration keyword based on a word corresponding to the input keyword, a word included in the T&D information, and a word included in the corresponding advertisement site, or may determine the registration keyword according to a word having a close correlation with the word. It is contemplated that not only the word but also a word having a close correlation with the word or a fact that whether the word is purchased as the keyword may be used for determining the registration keyword.

The search result providing system may determine the registration keyword based on at least one of (1) whether a keyword is purchased, (2) whether the input keyword partially matches a word or phrase included in the at least one portion of information, (3) a correlation between words, (4) a correlation of the T&D information, (5) a site crawling based on a URL included in the T&D information, (6) an advertisement performance according to the input keyword or the registration keyword or any combinations thereof. In this example, the correlation between words may be measured based on at least one word of the input keyword, a word associated with the T&D information and a website based on the URL or the both. The correlation of the T&D information may include a correlation measured between the T&D information and the input keyword. For example, the search result providing system may determine the registration keyword according to a word having a correlation with the input keyword closer than a predetermined correlation among words of the T&D information.

The search result providing system may perform a clustering with respect to a plurality of keywords to generate and maintain at least one keyword set, and may determine a registration keyword to be additionally registered based on the keyword set and at least one portion of information inputted associated with a registration of an input keyword. In this example, the search result providing system may generate the keyword set by clustering the plurality of keywords based on at least one of (1) whether a keyword is purchased, (2) whether the input keyword partially matches a word or phrase included in the at least one portion of information, (3) a correlation between words, (4) a correlation of the T&D information, (5) a site crawling based on a URL of the T&D information, (6) an advertisement performance according to the input keyword or the registration keyword or any combinations thereof. As described above, the information may include the input keyword and the T&D information associated with the input keyword. In this example, the search result providing system may determine the registration keyword based on at least one keyword among keywords in the keyword set including a word corresponding to the at least one piece of information. For example, the search result providing system may determine the registration keyword based on at least one keyword among keywords in the keyword set including an input keyword corresponding to a keyword to be registered.

In operation S503, the search result providing system may additionally register the registration keyword associated with the input keyword. When an advertiser inputs the input keyword as a keyword with respect to an advertisement, the search result providing system may optionally determine the registration keyword, and may additionally register the registration keyword associated with the input keyword.

In operation S504, the search result providing system may update registration keyword according to at least one of a change of information, a predetermined period of time or the both. A URL of a website that the advertiser desires to expose according to the input keyword may be changed, or a correlation between words may be changed over time. For example, when an entertainer appears in an advertisement for a product, a correlation between a name of the entertainer and a name of the product may rapidly increase, and the correlation may be decreased over time. Thus, the search result providing system may enable a keyword having closer correlation to be automatically registered with respect to the advertisement of the advertiser by updating the registration keyword according to at least one of a change of information, a predetermined period of time or the both.

In operation S505, the search result providing system may expose a search result associated with the input keyword if a keyword received from a user corresponds to at least one of the input keyword and the registration keyword. Since the advertiser may desire that the advertisement is exposed only with respect to the input keyword inputted by the advertiser, the search result providing system may enable the advertiser to determine whether the registration keyword is used by providing the determining function associated with the page.

For example, the search result providing system may reduce additional costs by predetermining a maximum cost with respect to a cost incurred based on the registration keyword, or by preventing the advertisement of the advertiser from being exposed with respect to the registration keyword having low priority.

As described above, when the search result providing system according to exemplary embodiments of the present invention is used, an amount to which an advertisement is applied may be extended to maximize an advertisement effect and to increase a revenue by additionally registering the registration keyword corresponding to a keyword extended based on the T&D information and the input keyword inputted from the advertiser during the registration of the keyword. The advertisement effect may be maximized and revenue may be increased by additionally registering the registration keyword based on the input keyword and the T&D information to expose the advertisement with respect to other keywords associated with the advertisement of the advertiser.

The amount to which the advertisement is applied may be extended to maximize an advertisement effect and increase revenue by performing a clustering with respect to a plurality of keywords to generate and maintain at least one keyword set, and by additionally registering the registration keyword according to at least one keyword among keywords of the keyword set including a word corresponding to the at least one of information.

Exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A computer implemented search result providing system, comprising:
    a non-transitory storage device having one or more units, executable by a processor, the one or more units including:
    a registration keyword determining unit configured to determine a registration keyword based on a correlation between at least one word of an input keyword received from an advertiser and at least one information of advertising contents of the input keyword, the at least one information of advertising contents including title and description (T&D) information and website information corresponding to a universal resource locator (URL) of the T&D information that are associated with a registration of the keyword;
    a registration keyword registration unit configured to register the registration keyword targeted to a search result associated with the input keyword based on the determination; and
    a search result exposing unit configured to provide search results based on one of the input keyword, additionally registered registration keyword, or both the input keyword and the additionally registered registration keyword corresponding to an input query;
    a registration keyword updating unit configured to update the registration keyword according to at least one change of the at least one information during a threshold period of time;
    a keyword set generator configured to perform a clustering with respect to a plurality of keywords to generate and maintain at least one keyword set based on whether a keyword is purchased or an advertisement performance according to an input keyword or a registration keyword, wherein the registration keyword determining unit is configured to determine the registration keyword based on at least one keyword among keywords in the keyword set;
    a determining function provider configured to determine to expose advertisement selectively using the input keyword or additionally registered keyword causing by determining function being selected; and
    a search result exposing unit configured to expose a search result in response to receipt of a search keyword transmitted from a user terminal corresponding to at least one of the input keyword, additionally registered keyword or the both of the input keyword and the additionally registered keyword.

2. The system of claim 1, wherein the generation of the extended keyword is performed based on at least one of:
    whether the input keyword is purchased,
    whether the input keyword partially matches a word or phrase associated with the at least one of information including,
    a correlation measured between words,
    a correlation measured between the T & D information and the keyword,
    a site crawling based on a URL of the T & D information, or
    an advertisement performance according to the keyword.

3. The system of claim 2, wherein the correlation is determined based on at least one word of the keyword, a word associated with the T & D information, a website based on the URL, or any combination thereof.

4. A search result providing apparatus, comprising:
    a processor;
    a non-transitory storage device having one or more units;
    a keyword registration unit configured to perform a clustering with respect to a plurality of keywords to generate and maintain at least one keyword set;
    a keyword determining unit configured to determine, by the processor, a registration keyword based on a correlation between at least one word of an input keyword received from an advertiser and at least one information of advertising contents of the input keyword, the at least one information of advertising contents including title and description (T&D) information and website information corresponding to a universal resource locator (URL) of the T&D information that are associated with a registration of the keyword;
    a registration keyword registration unit configured to register the registration keyword targeted to a search result associated with the input keyword based on the determination; and
    a search result exposing unit configured to provide search results using one of the input keyword, additionally registered registration keyword, or both the input keyword and the additionally registered registration keyword corresponding to an input query;

a registration keyword updating unit configured to update the registration keyword according to at least one change of the at least one information during a threshold period of time;

a keyword set generator configured to perform a clustering with respect to a plurality of keywords to generate and maintain at least one keyword set based on whether a keyword is purchased or an advertisement performance according to an input keyword or a registration keyword, wherein the registration keyword determining unit is configured to determine the registration keyword based on at least one keyword among keywords in the keyword set;

a determining function provider configured to determine to expose advertisement selectively using the input keyword or additionally registered keyword causing by determining function being selected; and a search result exposing unit configured to expose a search result in response to receipt of a search keyword transmitted from a user terminal corresponding to at least one of the input keyword, additionally registered keyword or the both of the input keyword and the additionally registered keyword.

5. The apparatus of claim 4, wherein the performing the clustering with respect to a plurality of keywords based on at least one of:
whether a keyword is purchased,
whether the keyword partially matches a word or phrase of the at least one of information including,
a correlation measured between words,
a correlation of the T & D information and the keyword,
a site crawling based on a universal resource locator (URL) of the T & D information, or
an advertisement performance according to the keyword.

6. A search result providing method using a processor, the method comprising:
providing a page in association with registering an advertising keyword;
determining the registration keyword based on a correlation between at least one word of the input keyword received from an advertiser and at least one information of advertising contents of the input keyword, the at least one information of advertising contents including title and description (T&D) information and website information corresponding to a universal resource locator (URL) of the T&D information that are associated with a registration of the keyword;
registering the registration keyword targeted to a search result associated with the input keyword based on the determination; and
providing search results based on one of the input keyword, additionally registered registration keyword, or both the input keyword and the additionally registered registration keyword corresponding to an input query;
updating the registration keyword according to at least one change of the at least one information during a threshold period of time;
performing a clustering with respect to a plurality of keywords to generate and maintain at least one keyword set based on whether a keyword is purchased or an advertisement performance according to an input keyword or a registration keyword, and determining the registration keyword based on at least one keyword among keywords in the keyword set;
determining to expose advertisement selectively using the input keyword or additionally registered keyword causing by determining function being selected; and
exposing a search result in response to receipt of a search keyword transmitted from a user terminal corresponding to at least one of the input keyword, additionally registered keyword or the both of the input keyword and the additionally registered keyword.

7. The method of claim 6, further comprising:
determining whether the registration keyword is used using an interface with which the advertising keyword is registered.

8. The method of claim 6, further comprising:
outputting a search result based on one of the input keyword,
additionally registered registration keyword, or both the input keyword and the additionally registered registration keyword corresponding to an input query in response to receipt of a search keyword transmitted from a user terminal.

9. The method of claim 6, wherein performing the clustering with respect to a plurality of keywords based on at least one of:
whether a keyword is purchased,
whether the keyword partially matches a word or phrase of the at least one of information including,
a correlation measured between words,
a correlation measured between the T & D information and the keyword,
a site crawling based on a universal resource locator (URL) of the T & D information, or an advertisement performance according to the keyword.

10. A non-transitory computer-readable storage medium comprising an executable program, which when executed, instructs a computer to perform the method of claim 6.

* * * * *